United States Patent [19]

Drent et al.

[11] Patent Number: 5,225,523
[45] Date of Patent: Jul. 6, 1993

[54] POLYKETONE POLYMER PREPARATION WITH TETRA ALKYL BIS PHOSPHINE LIGAND AND HYDROGEN

[75] Inventors: Eit Drent; Johannes J. Keijsper, both of Amsterdam, Netherlands

[73] Assignee: Shell Oil Company, Houston, Tex.

[21] Appl. No.: 901,304

[22] Filed: Jun. 19, 1992

[30] Foreign Application Priority Data

Jul. 2, 1991 [NL] Netherlands .......................... 9101152

[51] Int. Cl.$^5$ .............................................. C08G 67/02
[52] U.S. Cl. .................... 528/392; 528/271; 568/387; 568/408; 568/412
[58] Field of Search ................ 528/392, 271; 568/387, 568/408, 412

[56] References Cited

U.S. PATENT DOCUMENTS

| | | |
|---|---|---|
| 4,778,876 | 10/1988 | Doyle et al. |
| 4,843,144 | 6/1989 | Van Broekhoven et al. |
| 4,880,903 | 11/1989 | Van Broekhoven et al. |
| 4,940,774 | 7/1990 | Wong |
| 5,037,944 | 8/1991 | Smaardijk et al. |

FOREIGN PATENT DOCUMENTS

| | | |
|---|---|---|
| 121965A2 | 10/1984 | European Pat. Off. |
| 248483 | 12/1987 | European Pat. Off. |
| 376364 | 7/1990 | European Pat. Off. |
| 384517 | 8/1990 | European Pat. Off. |
| 393790 | 10/1990 | European Pat. Off. |
| 460743 | 12/1991 | European Pat. Off. |
| 673284A5 | 2/1990 | Switzerland |
| 673656A5 | 3/1990 | Switzerland |
| 1081304 | 8/1967 | United Kingdom |

*Primary Examiner*—Harold D. Anderson
*Attorney, Agent, or Firm*—Denise Y. Wolfs

[57] ABSTRACT

A process for the preparation of low molecular weight polyketone polymers, wherein polymers of carbon monoxide with ethene and/or propene and optionally in addition with one or more other α-olefins are prepared by contacting the monomers in the presence of hydrogen with a catalyst containing a Group VIII metal and a tetraalkylbisphosphine ligand. The process may also be conducted in the presence of a liquid α-olefin diluent.

17 Claims, No Drawings

POLYKETONE POLYMER PREPARATION WITH TETRA ALKYL BIS PHOSPHINE LIGAND AND HYDROGEN

The invention relates to a process for the preparation of polymers of carbon monoxide with one or more α-olefins.

BACKGROUND OF THE INVENTION

Linear polymers of carbon monoxide and one or more α-olefins in which the monomer units from carbon monoxide and the monomer units from the olefins are present in an alternating arrangement can be prepared by contacting the monomers with a catalyst composition containing a Group VIII metal and a phosphorus bidentate ligand of the general formula

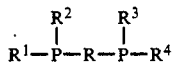

in which $R^1$, $R^2$, $R^3$, and $R^4$ each represent identical or different monovalent aromatic or aliphatic hydrocarbon groups and R is a divalent organic bridging group containing at least two carbon atoms in the bridge connecting the two phosphorus atoms to each other. Using these catalyst compositions, linear alternating polyketone polymers are obtained with an average molecular weight, calculated as number average ($\overline{M}_n$), of more than 10,000.

The polyketone polymers, or polyketones, have repeating units of the formula

wherein A is a unit derived from at least one olefinically unsaturated hydrocarbon. U.S. Pat. No. 4,880,903 (Van Broekhoven et al.), for example, discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal, the anion of a strong acid, and a bidentate ligand of phosphorus, nitrogen, or sulfur. U.S. Pat. No. 4,843,144 (Van Broekhoven et al.), for example, incorporated herein by reference, discloses a process for preparing polymers of carbon monoxide and at least one ethylenically unsaturated hydrocarbon using a catalyst comprising a compound of palladium, the anion of a non-hydrohalogenic acid having a pKa of below about 6 and a bidentate ligand of phosphorus.

For some applications there is a need for polyketone polymers with a considerably lower average molecular weight. These polymers can be used as such or can serve as starting material for the preparation of other valuable polymers by chemical modification. The carbonyl groups present in the polymers as functional groups can be converted by chemical reaction at least partly into a variety of other functional groups. This chemical modification changes the properties of the polymers and they become eligible for applications for which the original polymers were unsuitable or less suitable. Chemical reactions which can be applied to the low molecular weight polymers include the conversion to polyalcohols by catalytic hydrogenation, the conversion to polypyrroles by reaction with primary amines or ammonia, the conversion to polyamines or polythiols by catalytic hydrogenation in the presence of ammonia or hydrogen sulphide respectively, the conversion to polyphenols by condensation with phenols, and the conversion to polyketals by reaction with alcohols.

The applicant has carried out an investigation into the methods for preparation of polyketone polymers with a low average molecular weight. Initially, fractionation was tried as a means to separate a low molecular weight fraction from the material prepared in the conventional manner and having a number average molecular weight of more than 10,000. Apart from the fact that this separation method was very time consuming, it produced only a very low yield of the desired low molecular weight material. Carrying out the polymerization at very high temperatures was also rejected as unattractive, since this manner of processing has a very unfavorable influence on the stability o the catalyst composition.

In the course of continued research into this subject, it was determined that the presence of hydrogen could lead to the desired goal. The initial results from the use of catalyst compositions containing a tetraarylbisphosphine as bidentate ligand were disappointing. Although it was possible in this way to achieve some reduction in the average molecular weight, the prepared polymers still possessed a $\overline{M}_n$ which was considerably higher than 10,000. Upon further investigation, however, it was surprisingly found that the presence of hydrogen has a very strong lowering effect on the average molecular weight of the prepared polymers if the polymerization is carried out using a catalyst composition containing a tetraalkylbisphosphine as bidentate ligand. In this way it was possible to prepare polymers with a $\overline{M}_n$ of less than 2500 in a high yield.

SUMMARY OF THE INVENTION

The present invention provides a process for the preparation of polymers wherein polymers of carbon monoxide with one or more α-olefins are prepared by contacting the monomers in the presence of hydrogen with a catalyst composition containing a Group VIII metal and a phosphorus bidentate ligand of the general formula

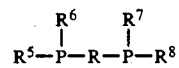

in which $R^5$, $R^6$, $R^7$, and $R^8$ each represent identical or different monovalent aliphatic hydrocarbon groups and R is a divalent organic bridging group containing at least two carbon atoms in the bridge connecting the two phosphorus atoms to each other. In particular, the invention provides such a process wherein the polymerization reaction occurs in the presence of hydrogen, present in an amount sufficient to maintain the number average molecular weight of the polymer product at less than about 2500. In an alternate embodiment, the polymerization reaction is conducted in the presence of both hydrogen and a compound of the general formula

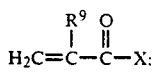

wherein $R^9$ is hydrogen or an alkyl group, and X is a hydroxyl group, an alkoxy group, or an optionally alkyl-substituted amino group. A very suitable compound of this formula is methyl acrylate. When the polymerization is conducted in the presence of such compounds, the polymer product has a number average molecular weight of less than about 1000. The invention further relates to the low molecular weight polymers thus prepared and to shaped objects consisting at least partly of these polymers.

DESCRIPTION OF THE INVENTION

In the investigation into preparing polymers with a reduced number average molecular weight, it has been determined that the presence of hydrogen in the polymerization reaction has a significant effect on the number average molecular weight of the polymer product. If the polymerization is carried out in the presence of a tetraalkylbisphosphine bidentate ligand, the presence of hydrogen will result in preparation of polymer with a number average molecular weight of less than about 2500.

Consequently, the process of making low molecular weight polyketone polymers is carried out in the presence of hydrogen. The polymerization takes place at a hydrogen partial pressure of from about 1 bar to about 50 bar, and preferably from about 2 bar to about 40 bar.

In the investigation into preparing polymers with a reduced number average molecular weight, it was further found that a additional reduction in the average molecular weight of the polymers can be achieved by additionally carrying out the polymerization in the presence of a compound of the general formula

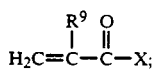

where $R^9$ represents hydrogen or an alkyl group and X a hydroxyl group, an alkoxy group, or an optionally alkyl-substituted amino group. By carrying out the polymerization in the presence of hydrogen and a compound of this type, polymers with a $\overline{M}_n$ of less than about 1000 can be prepared in a high yield. Suitable compounds include acrylates, and a very suitable compound of this formula is methyl acrylate, wherein $R^9$ is a methyl group and X is a hydroxyl group.

It has been found that the favorable effect of compounds of this general formula only occurs if the polymerization is carried out using a catalyst composition containing a tetraalkylbisphosphine and additionally in the presence of hydrogen. From the investigation by the inventors it was found that if the polymerization is carried out either using a catalyst composition containing a tetraalkylbisphosphine but in the absence of hydrogen, or in the presence of hydrogen but using a catalyst composition containing a tetraarylbisphosphine, the presence of the above-mentioned compounds has such an inhibiting influence on the polymerization that hardly any polymerization takes place.

In the catalyst compositions according to the invention, Group VIII metals are understood to be the noble metals ruthenium, rhodium, palladium, osmium, iridium and platinum, as well as the iron group metals iron, cobalt and nickel. The Group VIII metal is preferably selected from palladium, nickel and cobalt. Palladium is particularly preferred as Group VIII metal. The incorporation of the Group VIII metal in the catalyst compositions preferably takes place in the form of a salt of a carboxylic acid, in particular in the form of an acetate.

The phosphorus bidentate ligands of the general formula

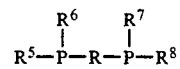

are suitable for use in the catalyst compositions. The groups $R^5$, $R^6$, $R^7$, and $R^8$ each represent identical or different monovalent aliphatic hydrocarbon groups, and preferably each contains not more than 6 carbon atoms. Phosphorus bidentate ligands in which the groups $R^5$, $R^6$, $R^7$, and $R^8$ are the same as one another are preferred. Examples of suitable groups include methyl, ethyl, n-propyl and n-butyl groups. R is a divalent organic bridging group containing at least two carbon atoms in the bridge connecting the two phosphorus atoms to each other. There is preference for bridging groups containing three atoms in the bridge, of which at least two are carbon atoms. Examples of suitable bridging groups R are the $-CH_2CH_2CH_2-$ group, the $-CH_2C(CH_3)_2CH_2-$ group and the $-CH_2Si(CH_3)_2CH_2-$ group. A very suitable phosphorus bidentate ligand is 1,3-bis(di-n-butylphosphino)propane. The phosphorus bidentate ligands in the catalyst compositions are used in a quantity of from about 0.5 to about 2 moles per mole Group VIII metal and preferably from about 0.75 to about 1.5 moles per mole Group VIII metal.

In addition to a Group VIII metal and a phosphorus bidentate ligand, the catalyst compositions used in the polymer preparation according to the invention also contain an anion of an acid with a pKa of less than 4 and in particular an anion of an acid with a pKa of less than 2. Examples of acids with a pKa of less than 2 are mineral acids such as perchloric acid, sulphonic acids such as para-toluenesulphonic acid and trifluoromethane-sulphonic acid and halocarboxylic acids such as trifluoroacetic acid. There is preference for a sulphonic acid such as tri-fluoromethanesulphonic acid. The incorporation of the anion of an acid with a pKa of less than 4 in the catalyst composition can take place in the form of an acid and/or in the form of a salt. A nickel salt such as nickel perchlorate is very suitable as a salt. The anion is present in the catalyst compositions in a quantity of from about 1 to about 100 moles per mole Group VIII metal and preferably from about 2 to about 50 moles per mole of Group VIII metal.

In addition to a Group VIII metal, a phosphorus bidentate ligand and optionally an anion of an acid with a pKa of less than 4, the catalyst compositions useful in the polymer preparation according to the invention preferably also contain an organic oxidizing agent. Examples of suitable organic oxidizing agents are 1,2- and 1,4-quinones, aliphatic nitrites such as butyl nitrite and aromatic nitro compounds such as nitrobenzene and 2,4-dinitrotoluene. 1,4-quinones are preferred, and in particular 1,4-benzoquinone and 1,4-naphthoquinone. The organic oxidizing agent is present in the catalyst compositions in a quantity of from about 5 to about 5000 moles per mole of Group VIII metal, and preferably from about 10 to about 1000 moles per mole of Group VIII metal.

In the preparation of polymers of carbon monoxide with ethene and with one or more α-olefins having at least three carbon atoms per molecule (hereinafter referred to as $C_{3+}$ α-olefins for brevity) using catalyst compositions containing a Group VIII metal and a phosphorus bidentate ligand, polymers are obtained in which a proportion of the units from carbon monoxide occur in 2,5-furandiyl groups, which groups are substantially present as 3-alkyl-2,5-furandiyl groups. The more $C_{3+}$ α-olefins the prepared polymers contain, the higher the percentage of the units from carbon monoxide that are present in optionally 3-alkyl substituted 2,5-furandiyl groups. If such catalyst compositions are employed in the preparation of polymers of carbon monoxide with one or more $C_{3+}$ α-olefins (i.e. without ethene), polymers are obtained in which more than 10% of the units from carbon monoxide are present in 3-alkyl-2,5-furandiyl groups. In some cases, as much as about 50% of the units from carbon monoxide can be present bonded in this way.

The presence of a substantial percentage of the units from carbon monoxide in optionally 3-alkyl-substituted furandiyl groups is undesirable for two reasons. First, it adversely affects the stability of the polymers. The second drawback is related to the possibility of chemical modification of the polymers via the carbonyl groups present therein. The higher the percentage of the units from carbon monoxide in optionally 3-alkyl substituted 2,5-furandiyl groups, the lower the percentage of these units that are present as carbonyl groups. This limits the possibility of chemical modification of the polymers.

During the investigations by the applicant it was also found that if in the preparation of polymers of carbon monoxide with propene, and optionally also with one or more other α-olefins, the polymerization is carried out according to the invention in the presence of hydrogen and a catalyst composition presence of a liquid diluent consisting substantially of one or more of the $C_{3+}$ α-olefins employed as monomers, not only are polymers with a low average molecular weight obtained, but, moreover, the furan formation is combated extremely effectively in this polymerization. In particular, less than 10%, and preferably less than 1%, of the units derived from carbon monoxide are present as 2,5-furandiyl groups.

If the process of the invention is employed for the preparation of polymers of carbon monoxide with ethene and/or propene and also with one or more other α-olefins, the latter α-olefins preferably contain fewer than 10 carbon atoms per molecule. The process of the invention is particularly important for the preparation of polymers of carbon monoxide with ethene and/or propene.

The preparation of the polymers according to the invention is preferably carried out in the presence of a liquid diluent. Polar liquids are preferably used as diluents. These liquids can be protic or aprotic. An example of a suitable protic liquid is methanol. Examples of suitable aprotic liquids are acetone and tetrahydrofuran. If desired, the polymerization can also be carried out in the gas phase. If in the preparation of polymers of carbon monoxide with propene and optionally also with one or more other α-olefins it is intended to minimize the furan formation the polymerization should be carried out in the presence of a liquid diluent consisting substantially of one or more of the $C_{3+}$ α-olefins employed as monomers. The polymer preparation can be carried out either batchwise or continuously.

The quantity of catalyst composition used in the preparation of the polymers can vary within wide limits. Per mole of olefinically unsaturated compound to be polymerized a quantity of catalyst composition is preferably used which contains from about $1 \times 10^{-7}$ to about $1 \times 10^{-3}$ moles Group VIII metal and most preferably from about $1 \times 10^{-6}$ to about $1 \times 10^{-4}$ moles Group VIII metal.

The preparation of the polymers is preferably carried out at a temperature of from about 20° C. to about 150° C. and a pressure of from about 2 to about 150 bar, and most preferably at a temperature of from about 30° C. to about 130° C. and a pressure of from about 5 to about 100 bar. The molar ratio of the olefinically unsaturated compounds relative to carbon monoxide is preferably from about 10:1 to about 1:10 and most preferably from about 5:1 to about 1:5.

The invention will now be illustrated with reference to the following Comparative Examples (not of the invention) and Illustrative Examples, which are not to be construed as limiting.

ILLUSTRATIVE EXAMPLE 1

A carbon monoxide/ethene copolymer was prepared as follows. Into a stirred autoclave with a volume of 250 ml a catalyst solution was introduced consisting of:
  40 ml tetrahydrofuran,
  0.1 mmol palladium acetate,
  0.3 mmol trifluoromethanesulphonic acid, and
  0.2 mmol 1,3-bis(di-n-butylphosphino)propane.

After successively forcing in 25 bar carbon monoxide, 5 bar hydrogen and 20 bar ethene, the autoclave contents were brought to 80° C. After 5 hours the polymerization was terminated by cooling the reaction mixture to room temperature and releasing the pressure. The polymer was filtered off, washed with methanol and dried. 10.5 g copolymer with a $\overline{M}_n$ of 1400 was obtained.

ILLUSTRATIVE EXAMPLE 2

A carbon monoxide/ethene copolymer was prepared in substantially the same way as in Illustrative Example 1, but with the difference that in addition 30 ml methylacrylate was introduced into the autoclave. 7.5 g copolymer with a $\overline{M}_n$ of 350 was obtained.

COMPARATIVE EXAMPLE 1

Illustrative Example 2 was substantially repeated, but with the difference that no hydrogen was forced into the autoclave. Only a trace of polymer material was obtained.

COMPARATIVE EXAMPLE 2

Illustrative Example 2 was substantially repeated, but with the difference that the catalyst solution contained 0.2 mmol 1,3-bis(diphenylphosphino)propane instead of 1,3-bis(di-n-butylphosphino)propane. Only a trace of polymer material was obtained.

COMPARATIVE EXAMPLE 3

A carbon monoxide/ethene copolymer was prepared in substantially the same way as in Illustrative Example 1, but with the difference that the catalyst solution contained 0.2 mmol 1,3-bis(diphenylphosphino) propane instead of 1,3-bis(di-n-butylphosphino)propane. 7 g copolymer with a $\overline{M}_n$ >20,000 was obtained.

COMPARATIVE EXAMPLE 4

A carbon monoxide/propene copolymer was prepared as follows. Into a stirred autoclave with a volume of 300 ml and from which air had been driven by purging with nitrogen, a catalyst solution was introduced consisting of:
 120 ml methanol,
 0.10 mmol palladium acetate,
 0.11 mmol 1,3-bis(diphenylphosphino)propane, and
 0.2 mmol para-toluenesulphonic acid.

After adding 26 g propene, the autoclave contents were brought to 60° C. and carbon monoxide was then forced in until a pressure of 40 bar was reached. During the polymerization the pressure was kept constant by forcing in carbon monoxide. After 1 hour the polymerization was terminated by cooling the reaction mixture to room temperature and releasing the pressure. The polymer was isolated by evaporating down the reaction mixture. 6.9 g copolymer was obtained. The degree of furanization was 24%.

COMPARATIVE EXAMPLE 5

A carbon monoxide/propene copolymer was prepared as follows. Into a stirred autoclave with a volume of 100 ml and from which air had been driven by purging with nitrogen, a catalyst solution was introduced consisting of:
 40 ml methanol,
 0.05 mmol palladium acetate,
 0.055 mmol 1,4-bis(di-n-butylphosphino)butane, and
 0.1 mmol para-toluenesulphonic acid.

After adding 12.1 g propene, the autoclave contents were brought to 80° C. and carbon monoxide was then forced in until a pressure of 40 bar was reached. During the polymerization the pressure was kept constant by forcing in carbon monoxide. After 1 hour the polymerization was terminated by cooling the reaction mixture to room temperature and releasing the pressure. The polymer was isolated by evaporating down the reaction mixture. 1.0 g copolymer was obtained. The degree of furanization was 25%.

ILLUSTRATIVE EXAMPLE 3

A carbon monoxide/propene copolymer was prepared as follows. 200 ml propene was introduced into a stirred autoclave with a volume of 300 ml. After the autoclave contents had been brought to 80° C., carbon monoxide was forced in until a pressure of 50 bar was reached, and then hydrogen until a pressure of 55 bar was reached. A catalyst solution was then introduced into the autoclave consisting of:
 4 ml acetone,
 0.02 mmol palladium acetate,
 0.1 mmol nickel perchlorate, and
 0.024 mmol 1,3-bis(di n-butylphosphino)propane.

During the polymerization the pressure was kept constant by forcing in carbon monoxide. After 12 hours the polymerization was terminated by cooling the reaction mixture to room temperature and releasing the pressure. The polymer was isolated by evaporating down the reaction mixture. 3.7 g copolymer was obtained with a $\overline{M}_n$ of 910. The degree of furanization was less than 1%.

ILLUSTRATIVE EXAMPLE 4

A carbon monoxide/propene copolymer was prepared in substantially the same way as in Illustrative Example 3, but with the following differences:
 a) carbon monoxide was forced into the autoclave until a pressure of 55 bar was reached instead of 50 bar, and then hydrogen to a pressure of 58 bar instead of 55 bar.
 b) the catalyst solution additionally contained 7 ml n-pentane, and
 c) the reaction time was 16 hours instead of 12 hours.

13.4 g copolymer was obtained with a $\overline{M}_n$ of 1260. The degree of furanization was less than 1%.

ILLUSTRATIVE EXAMPLE 5

A carbon monoxide/ethene/propene terpolymer was prepared in substantially the same way as the carbon monoxide/propene copolymer in Illustrative Example 3, but with the following differences:
 a) the reaction temperature was 75° C. instead of 80° C.,
 b) a 1:1 carbon monoxide/ethene mixture was forced into the autoclave until a pressure of 55 bar was reached instead of carbon monoxide to a pressure of 50 bar, and then hydrogen to a pressure of 59 bar instead of 55 bar.
 c) the catalyst solution additionally contained 7 ml n-pentane, and
 d) the reaction time was 18 hours instead of 12 hours.

10.5 g terpolymer was obtained with a $\overline{M}_n$ of 1350. The degree of furanization was less than 1%.

According to these examples, in the presence of hydrogen and using catalyst compositions containing a tetraalkylbisphosphine as phosphorus bidentate ligand, polymers of carbon monoxide with ethene and/or propene were prepared with a $\overline{M}_n$ <2500. Comparative Examples 1 and 2 demonstrate the inhibiting effect of methyl acrylate on the polymer formation if the polymerization is carried out either using a catalyst composition containing a tetraalkylbisphosphine but in the absence of hydrogen, or in the presence of hydrogen but using a catalyst composition containing a tetraarylbisphosphine. Comparative Example 3 shows that if the polymerization is carried out using a catalyst composition containing a tetraarylbisphosphine, polymers with a very high average molecular weight are obtained, despite the fact that the polymerization is carried out in the presence of hydrogen. Comparative Examples 4 and 5 demonstrate the high degree of furanization, both when using a catalyst composition containing a tetraalkylbisphosphine and when using a catalyst composition containing a tetraarylbisphosphine, if the polymerization is carried out in methanol as diluent. The degree of furanization is understood in this patent application as the number of units from carbon monoxide present in optionally 3-alkyl-substituted 2,5-furandiyl groups as a percentage of the total number of units from carbon monoxide that are present in the polymers. The degree of furanization was determined with the aid of NMR analysis.

The lowering influence on the number average molecular weight of the polymers which occurs if the polymerization according to the invention is carried out in the presence of methyl acrylate can be seen by comparison of the results of Illustrative Examples 1 and 2. The results of Illustrative Examples 3-5 demonstrate the low degree of furanization which occurs if the polymerization according to the invention is carried out in liquid propene as diluent.

It was established by NMR analysis that the polymers prepared according to Illustrative Examples 1–5 and Comparative Examples 3–5 were built up from linear chains in which the units from carbon monoxide and the units from the olefins occurred in an alternating arrangement. In the polymers prepared according to Illustrative Example 5 the units from ethene and propene were present in a random arrangement relative to one another.

We claim:

1. In the process of producing a linear alternating polymer of carbon monoxide and at least one α-olefin, by contacting the carbon monoxide and α-olefin in a reactor under polymerization conditions in the presence of a liquid diluent and a catalyst composition formed from a palladium salt, the anion of an acid with a pKa of less than four, and a tetraalkylbisphosphine ligand, the improvement wherein polymerization is conducted in the presence of hydrogen, wherein the hydrogen is present in the reactor in an amount sufficient to produce a polymer product with a number average molecular weight of less than about 2500.

2. The process of claim 1 wherein the polymerization is conducted in the presence of a hydrogen partial pressure between about 1 and about 50 bar.

3. The process of claim 1 wherein the polymerization is conducted in the presence of a hydrogen partial pressure between about 2 and about 40 bar.

4. The process of claim 1 wherein the polymerization is conducted in the presence of a compound of the formula

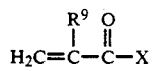

wherein $R^9$ is hydrogen or an alkyl group, and X is a hydroxyl group, an alkoxy group, an alkoxy group, or an amino group with or without alkyl substitution; and wherein the polymer product has a number average molecular weight of less than about 1000.

5. The process of claim 1 wherein the polymerization is conducted in the presence of an acrylate, and wherein the polymer product has a number average molecular weight of less than about 1000.

6. The process of claim 5 wherein the polymerization is conducted in the presence of methyl acrylate.

7. In the process of producing a linear alternating polymer of carbon monoxide and ethene, with or without propene, by contacting the carbon monoxide and α-olefin in a reactor under polymerization conditions in the presence of a liquid diluent and a catalyst composition formed from a palladium salt, the anion of an acid with a pKa of less than four, and a tetraalkylbisphosphine is conducted in the presence of hydrogen, where the hydrogen is present in the reactor in an amount sufficient to produce a polymer product with a number average molecular weight of less than about 2500.

8. The process of claim 7 wherein the polymerization is conducted in the presence of a hydrogen partial pressure between about 1 bar and about 50 bar.

9. The process of claim 7 wherein the polymerization is conducted in the presence of a hydrogen partial pressure between about 2 bar and about 40 bar.

10. The process of claim 7 wherein the polymerization is conducted in the presence of a compound of the formula

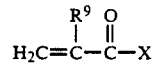

wherein $R^9$ is hydrogen or an alkyl group, and X is a hydroxyl group, an alkoxy group, an alkoxy group, or an amino group with or without alkyl substitution; and wherein the polymer product has a number average molecular weight of less than about 1000.

11. The process of claim 7 wherein the polymerization is conducted in the presence of an acrylate, and wherein the polymer product has a number average molecular weight of less than about 1000.

12. The process of claim 11 wherein the polymerization is conducted in the presence of methyl acrylate.

13. In the process of producing a linear alternating polymer of carbon monoxide and propene, with or without one or more other α-olefins, by contacting the carbon monoxide and α-olefin in a reactor under polymerization conditions in the presence of a liquid diluent and a catalyst composition formed from a palladium salt, the anion of an acid with a pKa of less than four, and a tetraalkylbisphosphine ligand, the improvement wherein polymerization is conducted in the presence of hydrogen, and wherein the liquid diluent is a $C_{3+}$ α-olefin present in the reactor in a liquid phase in an amount sufficient to produce a polymer product in which less than 10% of the units derived from carbon monoxide are present as 2,5-furandiyl groups.

14. The process of claim 13 wherein less than 1% of the units derived from carbon monoxide are present as 2,5-furandiyl groups.

15. The process of claim 13 wherein the linear alternating polymer is a polymer of carbon monoxide and propene, and the liquid diluent is propene.

16. The process of claim 13 wherein the linear alternating polymer is a polymer of carbon monoxide, propene, and ethene, and the liquid diluent is propene.

17. The process of claim 13 wherein the linear alternating polymer is a polymer of carbon monoxide, and one or more $C_{3+}$ α-olefins.

* * * * *